(12) United States Patent
Strijker

(10) Patent No.: US 10,998,827 B2
(45) Date of Patent: May 4, 2021

(54) SUPPLY VOLTAGE CONNECTED P-TYPE ACTIVE CLAMP FOR SWITCHED MODE POWER SUPPLY

(71) Applicant: NXP B.V., Eindhoven (NL)

(72) Inventor: Joan Wichard Strijker, Wijchen (NL)

(73) Assignee: NXP B.V., San Jose, CA (US)

( * ) Notice: Subject to any disclaimer, the term of this patent is extended or adjusted under 35 U.S.C. 154(b) by 66 days.

(21) Appl. No.: 16/151,332

(22) Filed: Oct. 3, 2018

(65) Prior Publication Data

US 2020/0112261 A1    Apr. 9, 2020

(51) Int. Cl.
*H02M 3/335* (2006.01)
*H02M 1/34* (2007.01)
*H02M 1/00* (2006.01)

(52) U.S. Cl.
CPC ......... *H02M 3/33592* (2013.01); *H02M 1/34* (2013.01); *H02M 3/33546* (2013.01); *H02M 3/3353* (2013.01); *H02M 2001/0054* (2013.01); *H02M 2001/342* (2013.01)

(58) Field of Classification Search
CPC ............... H02M 3/33592; H02M 1/34; H02M 3/33546; H02M 3/3353; H02M 2001/0054; H02M 2001/342; H02M 2001/0006; H02M 1/08; H02M 7/217; H02M 3/33569; H02M 1/32; Y02B 70/10
See application file for complete search history.

(56) References Cited

U.S. PATENT DOCUMENTS

| | | | |
|---|---|---|---|
| 6,249,444 B1* | 6/2001 | Cross | H02M 3/33569 363/21.03 |
| 6,452,818 B1 | 9/2002 | Simopoulos | |
| 6,856,523 B2* | 2/2005 | Griffin | H02M 3/33569 363/21.1 |
| 8,000,112 B2* | 8/2011 | Zhang | H02M 3/335 363/21.01 |
| 8,687,390 B2 | 4/2014 | Koike et al. | |
| 8,755,202 B2* | 6/2014 | Lee | H02M 3/33523 363/21.12 |
| 9,019,724 B2* | 4/2015 | Telefus | H02M 3/33523 363/21.01 |
| 10,008,948 B1* | 6/2018 | Strijker | H02M 1/34 |
| 10,038,387 B2* | 7/2018 | Yang | H02M 3/33569 |
| 2002/0125836 A1 | 9/2002 | Chu et al. | |

(Continued)

OTHER PUBLICATIONS

Lin, HL "Designing With Active Clamp Forward Topology", ON Semiconductor, 3 pgs., retrieved from the internet archive at: https://web.archive.org/web/20171227155946/http://blog.fairchildsemi.com/2014/active-clamp-introduction/ (Jan. 17, 2014).

(Continued)

*Primary Examiner* — Kyle J Moody

(57) ABSTRACT

This specification discloses devices and methods that provide for an improved switched mode power supply (SMPS) with a supply voltage connected p-type active clamp. In some embodiments, such an improved SMPS can have a p-type active clamp connected on one side to a positive voltage (which can preferably be the supply voltage), and on the other side to a clamp capacitor. Such an improved SMPS would then have the benefit of not requiring additional components (such as a level shifter, a high side supply voltage, a negative supply voltage, etc.) and the costs associated with these additional components.

17 Claims, 14 Drawing Sheets

(56) References Cited

U.S. PATENT DOCUMENTS

2015/0016153 A1  1/2015  Orr et al.
2016/0380425 A1* 12/2016 Chapman .......... H02M 3/33569
                                          363/21.01

OTHER PUBLICATIONS

Cheng, H. L. et al. "A Novel Interleaved Flyback-Typed Converter with ZVS Operation", IEEE $2^{nd}$ Annual Southern Power Electronics Conference, 6 pgs. (Dec. 2016).
Dheeraj, A. "Comparison of Active Clamping Circuits for Isolated Forward Converter", IEEE $6^{th}$ International Conference on Renewable Energy Research and Applications, pp. 839-841 (Nov. 2017).
Xue, L. et al. "Design Considerations of Highly-Efficient Active Clamp Flyback Converter Using GaN Power ICs", IEEE Applied Power Electronics Conference and Exposition, pp. 777-782 (Mar. 2018).
Liu, P.-H. "Design Consideration of Active Clamp Flyback Converter with Highly Nonlinear Junction Capacitance", IEEE Applied Power Electronics Conference and Exposition, pp. 783-790 (Mar. 2018).
"Mutual Inductance—Electronics Tutorials", AspenCore, 8 pgs., retrieved from the internet archive Oct. 2, 2018 at: https://web.archive.org/web/20170801051557/https://www.electronics-tutorials.ws/inductor/mutual-inductance.html (Aug. 2017).
Suskis, Pavels et al., "Design and Implementation of Flyback MPPT Converter for PV-Applications", 2014 Electric Power Quality and Supply Reliability Conference (PQ), Jun. 11, 2014, pp. 291-296, IEEE, Piscataway, NJ, USA.

* cited by examiner

SUPPLY VOLTAGE CONNECTED P-TYPE ACTIVE CLAMP FOR SWITCHED MODE POWER SUPPLY

FIELD

The described embodiments relate generally to devices and methods that provide for a switched mode power supply, and more particularly to devices and methods that provide for a switched mode power supply with supply voltage connected p-type active clamp.

BACKGROUND

A switched mode power supply (switching mode power supply or SMPS) is an electronic power supply that uses a switching regulator in order to control the conversion of electrical power in a highly efficient manner. This higher efficiency (thus lower heat dissipation) is the chief advantage of a switched mode power supply. A switched mode power supply can also be substantially smaller and lighter than say a linear supply due to the smaller transformer size and weight.

Therefore, there are strong motivations to develop devices and methods that provide for an improved switched mode power supply.

SUMMARY

This specification discloses devices and methods that provide for an improved switched mode power supply (SMPS) with a supply voltage connected p-type active clamp. In some embodiments, such an improved SMPS can have a p-type active clamp connected on one side to a positive voltage (which can preferably be the supply voltage), and on the other side to a clamp capacitor. Such an improved SMPS would then have the benefit of not requiring additional components (such as a level shifter, a high side supply voltage, a negative supply voltage, etc.) and the costs associated with these additional components.

The present invention provides for an active clamp switched mode power supply comprising: (a) a transformer, the transformer comprising a primary coil and a secondary coil; (b) a power switch, the power switch connected in series with the primary coil; (c) a clamp capacitor; (d) an active clamp switch, wherein the active clamp switch is a p-type switch connected on one side to a positive voltage and on the other side to the clamp capacitor, wherein the clamp capacitor is connected on one side to the active clamp switch and on the other side to both the primary coil and the power switch.

In some embodiments, the active clamp switch recycles energy from a leakage inductance in the transformer.

In some embodiments, the switched mode power supply is further comprising: (e) a first driver configured to drive the power switch; (f) a second driver configured to drive the active clamp switch, wherein the second driver is supplied by the positive voltage.

In some embodiments, the positive voltage is not an input voltage to the transformer.

In some embodiments, the positive voltage is a voltage higher than a switch-on voltage of the p-type switch and lower than the maximum voltage rating of an integrated circuit (IC).

In some embodiments, the positive voltage is a supply voltage.

In some embodiments, the transformer is a coupled inductor.

In some embodiments, the p-type switch is comprising of one of the following: (i) a p-type MOSFET (metal-oxide semiconductor field-effect transistor), (ii) a PNP BJT (bipolar junction transistor), (iii) any p-type semiconductor switching device.

In some embodiments, the p-type switch is a plurality of switches connected in series, wherein at least one of the plurality of switches is a p-type switching device connected to the positive voltage.

In some embodiments, the p-type switching device is comprising of one of the following: (i) a p-type MOSFET (metal-oxide semiconductor field-effect transistor), (ii) a PNP BJT (bipolar junction transistor), (iii) any p-type semiconductor switching device.

In some embodiments, a topology of the switched mode power supply is one of the following: (i) an active clamp flyback, (ii) an active clamp forward, (iii) any other active clamp switched mode power supply topology.

In some embodiments, an integrated circuit includes one of more of the following: (i) the power switch, (ii) the active clamp switch, (iii) the first driver, (iv) the second driver.

The present invention also provides for a method for operating an active clamp switched mode power supply, the method comprising: (a) providing a transformer, the transformer comprising a primary coil and a secondary coil; (b) providing a power switch, the power switch connected in series with the primary coil; (c) providing an active clamp switch and a clamp capacitor, wherein the active clamp switch is a p-type switch connected on one side to a positive voltage and on the other side to the clamp capacitor, wherein the clamp capacitor is connected on one side to the active clamp switch and on the other side to both the primary coil and the power switch.

In some method embodiments, the active clamp switch and the clamp capacitor recycles energy from a leakage inductance in the transformer.

In some method embodiments, the transformer transforms from a first voltage to a second voltage.

In some method embodiments, the power switch controls a power that is transformed by the transformer.

In some method embodiments, the method further comprising: (d) providing a first driver to drive the power switch; (e) providing a second driver to drive the active clamp switch, wherein the second driver is supplied by the positive voltage.

In some method embodiments, the positive voltage is not an input voltage to the transformer.

In some method embodiments, the positive voltage is a voltage higher than a switch-on voltage of the p-type switch and lower than the maximum voltage rating of an integrated circuit (IC).

The present invention provides for a computer program product comprising executable instructions encoded in a non-transitory computer readable medium which, when executed by a system, carry out or control the following method for operating an active clamp switched mode power supply, the method comprising: (a) providing a transformer, the transformer comprising a primary coil and a secondary coil; (b) providing a power switch, the power switch connected in series with the primary coil; (c) providing an active clamp switch and a clamp capacitor, wherein the active clamp switch is a p-type switch connected on one side to a positive voltage and on the other side to the clamp capacitor, wherein the clamp capacitor is connected on one side to the active clamp switch and on the other side to both the primary coil and the power switch.

The above summary is not intended to represent every example embodiment within the scope of the current or future Claim sets. Additional example embodiments are discussed within the Figures and Detailed Description below. Other aspects and advantages of embodiments of the present invention will become apparent from the following detailed description taken in conjunction with the accompanying drawings.

DETAILED DESCRIPTION

Figure 1A:
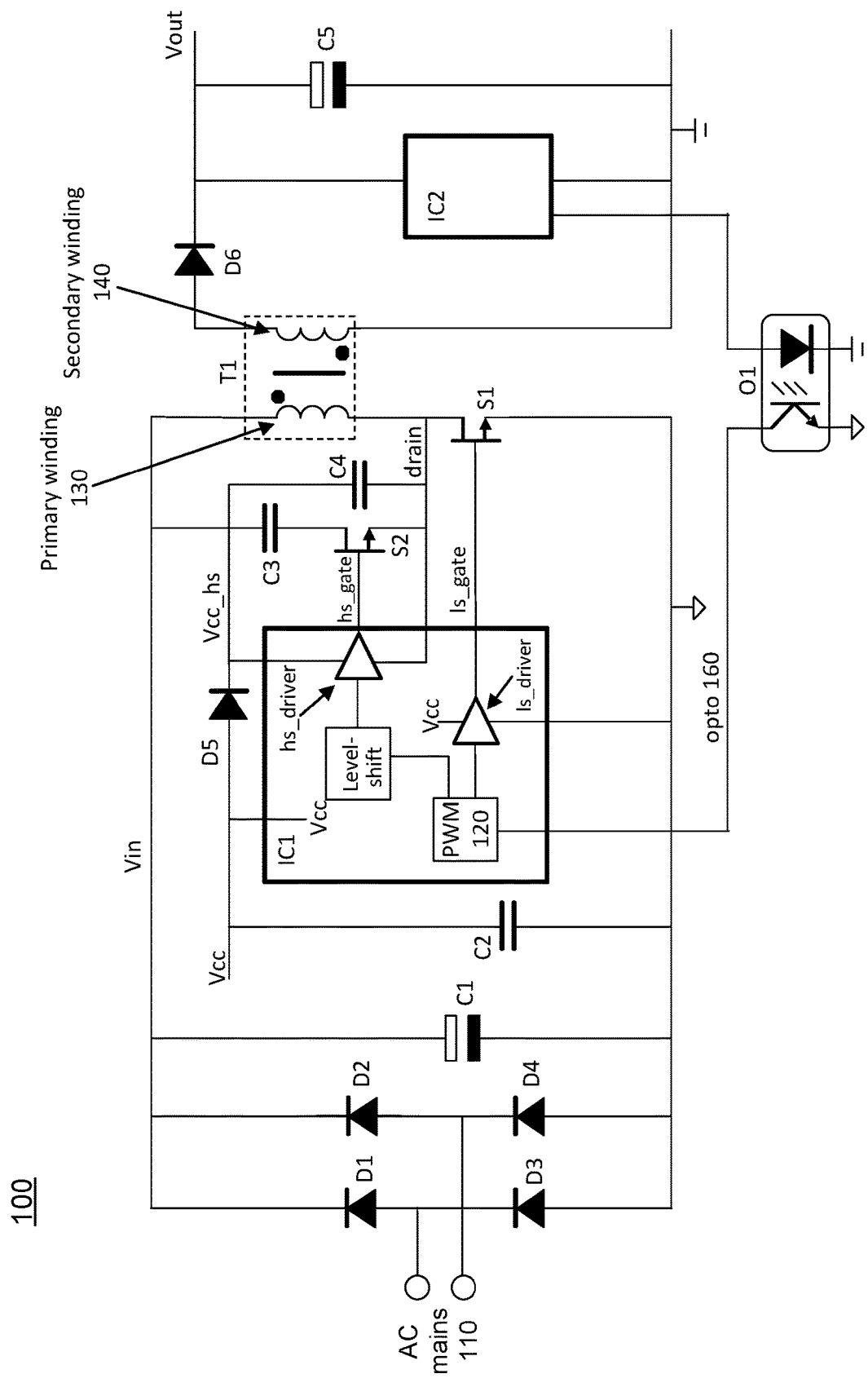
FIG. 1A shows a typical n-type switch "active clamp" switched mode power supply (SMPS).

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Active clamp circuits can be used in switched mode power supplies (SMPS) to recycle the leakage inductance losses.

For off-line flyback switched mode power supplies (SMPS), these active clamps are typically made with an n-type switch device and a high side driver. This high side driver adds significant cost to the SMPS due to a need for a level shifter. A p-type switch device can also be used, but a p-type switch device that is connected to ground would require a negative driving voltage, which can require additional components and costs. In some embodiments, this specification discloses switched mode power supplies (SMPS), which utilize a p-type switch device that is connected to the supply voltage and therefore no negative driving voltage is required. Such a SMPS would then have the benefit of not requiring additional components and costs.

FIG. 1A shows a typical n-type switch "active clamp" switched mode power supply (SMPS) 100. The AC mains 110, supplying the circuit, is connected via bridge rectifier diodes, D1, D2, D3 and D4 to an input storage capacitor C1. SMPS control IC (integrated circuit) is labelled as IC1 in FIG. 1A. IC1 drives MOSFET (metal-oxide-semiconductor field-effect transistor) switch S1 and S2 through pulse width modulator (PWM 120). The pulse width modulator drives S1 and S2 alternatively. When S1 is made conductive, S2 is made non-conductive. When S2 is conductive, S1 is made non-conductive. Typically, a small time interval exists between switching one switch to non-conductive and the other to conductive. During this small time interval, both switches are non-conductive. This small non-overlap time interval is required to prevent shoot through.

S1 is driven by a low side driver circuit, ls_driver, via low side gate signal ls_gate. S2 is driven by a high side driver circuit, hs_driver, via high side gate signal hs_gate. Pulse width modulator (PWM 120) controls the high side driver circuit, hs_driver, through a level shifter, level-shift. The level shifter is required because the high side driver references to the drain voltage instead of to ground (i.e., 0 volt).

IC1 is supplied by a supply voltage Vcc. The high side driver is supplied by supply voltage Vcc_hs. High side supply capacitor, C4, is charged through diode D5 the moment S1 is conductive and the drain voltage is (close to) zero.

Via transformer T1 and rectifier diode D6, the energy is transferred to the output capacitor C5 during the secondary stroke of the converter. FIG. 1A shows that transformer T1 is comprised of a primary winding 130 and a secondary winding 140, which are coupled via a mutual inductance.

The output voltage (Vout) is indirectly controlled by an integrated circuit IC2 via an opto-coupler (or optical isolator) O1. The opto-coupler O1 transfers electrical signal between the input side and the output side using light, wherein the output signal "opto 160" can be a measure of the light signal, which in turn is a measure of the output voltage (Vout) or the output power. The output signal "opto 160" is provided as an input to the pulse width modulator (PWM 120), so that the pulse width modulator (PWM 120) can adjust the pulse width modulation to provide the desired output voltage (Vout) or output power. The opto-coupler O1 (as shown in FIG. 1A) is comprised of LED (light-emitting diode) and a phototransistor in the same opaque package, but other types of opto-coupler can also be used. In some embodiments, the IC2 sends a power signal to an LED of opto-coupler O1. The LED of opto-coupler O1 emits light, which is picked up by a light-sensitive transistor of opto-coupler O1. The light-sensitive transistor of opto-coupler O1 then send a signal opto to IC1, which in turn controls PWM 120.

The input side and the output side of SMPS 100 are electrically isolated via T1 and O1.

Figure 1B:
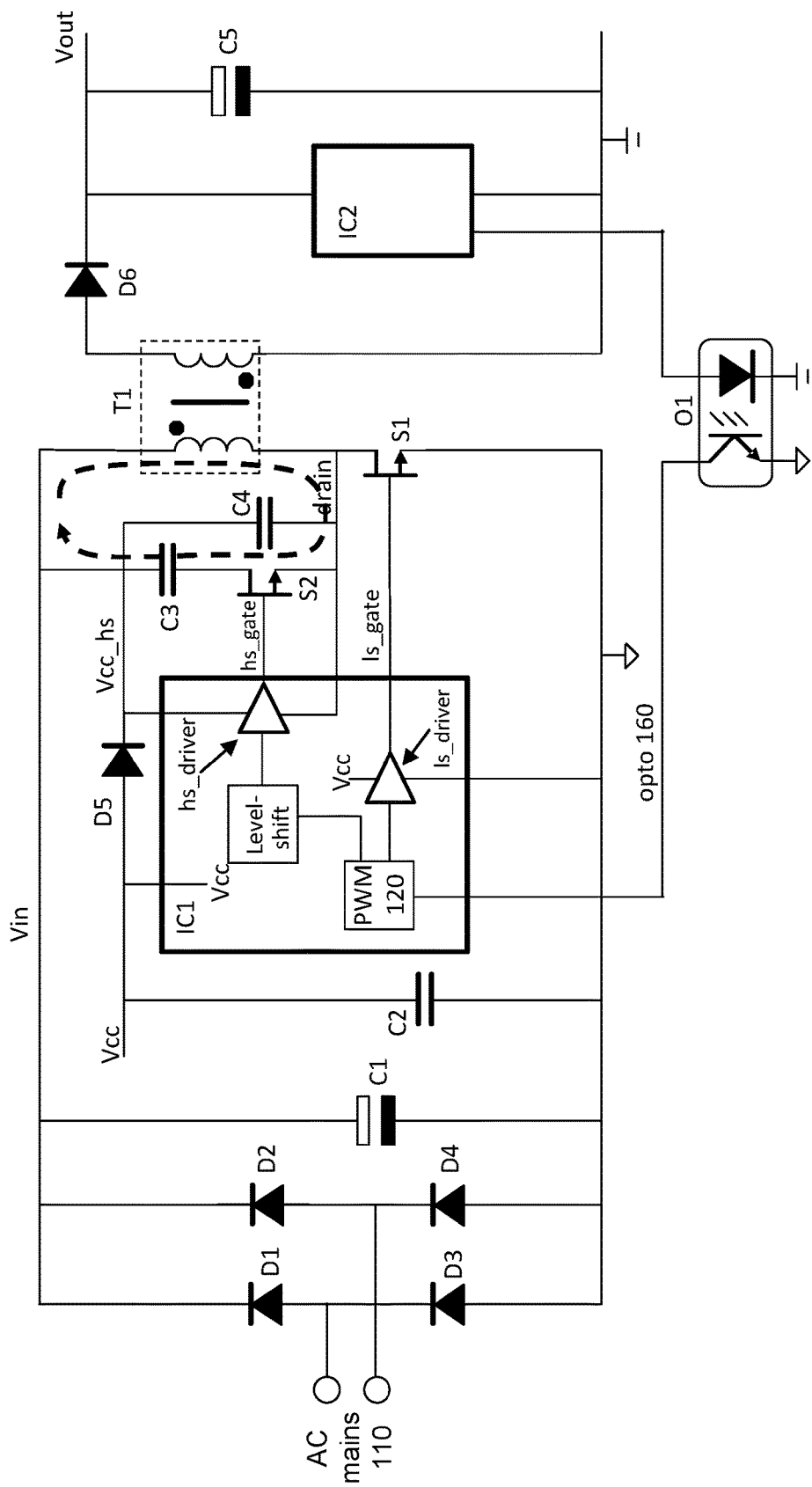
FIG. 1B shows a current path during an early part of the secondary stroke for an active clamp current in a typical n-type switch "active clamp" SMPS (from FIG. 1A).

FIG. 1B shows a current path during an early part of the secondary stroke for an active clamp current in a typical n-type switch "active clamp" SMPS (from FIG. 1A). In FIG. 1B, the current path is shown as a dashed line.

Figure 1C:
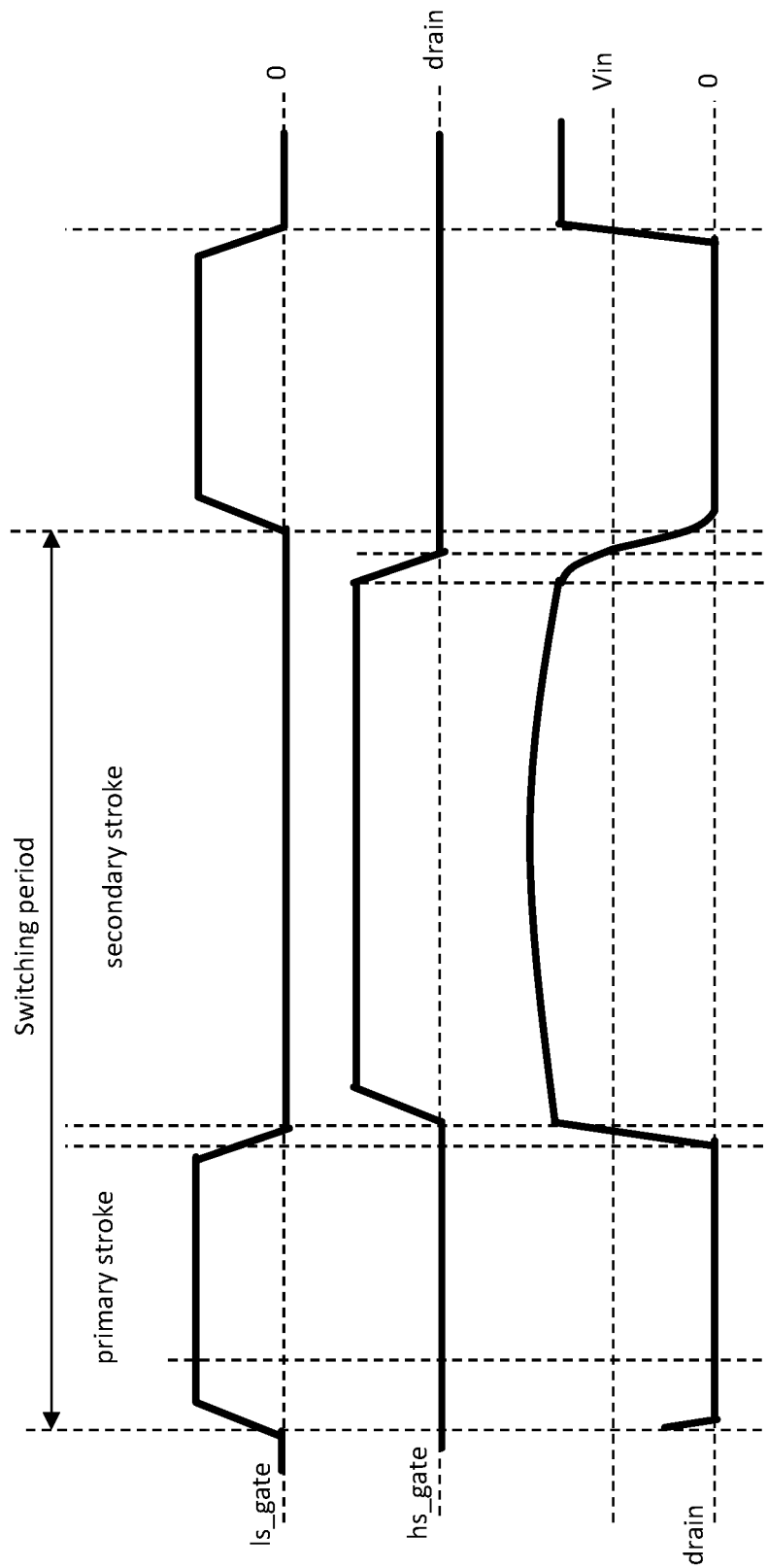
FIG. 1C shows relevant voltage signals (i.e., ls_gate, hs_gate, and drain) for a typical n-type switch "active clamp" SMPS (from FIG. 1A).

FIG. 1C shows relevant voltage signals (i.e., ls_gate, hs_gate, and drain) for a typical n-type switch "active clamp" SMPS (from FIG. 1A). Note that the hs_gate signal references to drain, since the low level is not ground (0 volt), but rather the drain voltage.

The low side gate signal ls_gate is used to control power switch S1, while the high side gate signal hs_gate is used to control the active clamp switch S2. Notice that when ls_gate is high (i.e., S1 is made conductive), hs_gate is low (i.e., S2 is made non-conductive). When ls_gate is low (i.e., S1 is made non-conductive), hs_gate is high (i.e., S2 is made conductive). Also notice that there is a small time interval existing between switching one switch to non-conductive and the other to conductive, when both switches are non-conductive. As explained previously, this small non-overlap time interval is required to prevent shoot through.

Also notice that when S1 is conductive (i.e., ls_gate is high), the drain voltage is (close to) zero. Then, when S1 is made non-conductive (i.e., ls_gate is low), S2 is made conductive (i.e., hs_gate is high), and the drain voltage is able to rise to become Vin and higher.

The active clamp flyback topology can be used to recycle the energy in the leakage inductance of the transformer in switched mode power supplies (SMPS). For example, in transformer T1 of FIG. 1A, the primary winding 130 and a secondary winding 140 are coupled via the mutual inductance. This coupling will be non-perfect. The leakage inductance will store some energy during the switching of the converter that will not be transferred to the secondary side. To recycle the energy in the leakage inductance an active clamp circuit is added. The circuit consists of clamp capacitor C3, clamp switch S2, driver circuit hs_driver, and level shifter (level-shift). The active clamp circuit transfers the energy from the leakage inductance to the clamp capacitor C3 at the start of the secondary stroke, and releases this energy to the output through transformer T1 during the rest of the secondary stroke. In this way, the active clamp flyback topology is able to recycle energy from the leakage inductance of the transformer.

Figure 2:
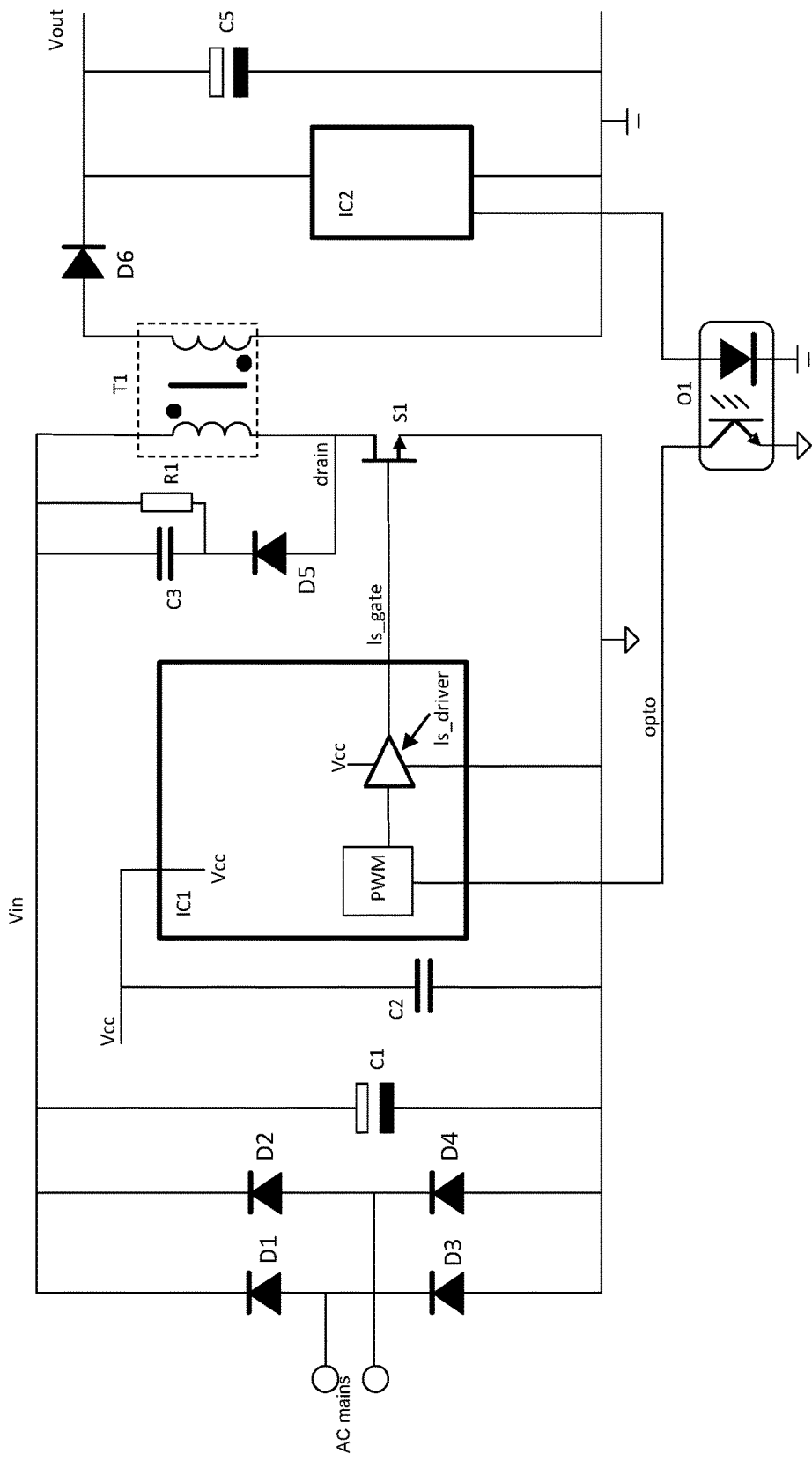
FIG. 2 shows a typical "passive clamp" (i.e., without an "active clamp") SMPS.

FIG. 2 shows a typical "passive clamp" (i.e., without an "active clamp") flyback SMPS.

In switched mode power supplies (SMPS) without an active clamp, a "passive clamp" is used, and the energy from the leakage inductance is dissipated in a resistor. As shown in FIG. 2, the passive RCD clamp consist of diode D5, capacitor C3 and resistor R1. Therefore, the energy from the leakage inductance is dissipated in the resistor R1.

Switched mode power supplies (SMPS) with passive (RCD) clamps are lower cost as compared to active clamp SMPS, but the "passive clamp" SMPS operate with a lower efficiency, because the leakage energy is dissipated instead of being recycled. Therefore, "active clamp" SMPS can be the preferred embodiment, if operating efficiency is of greater importance than cost.

Figure 3:
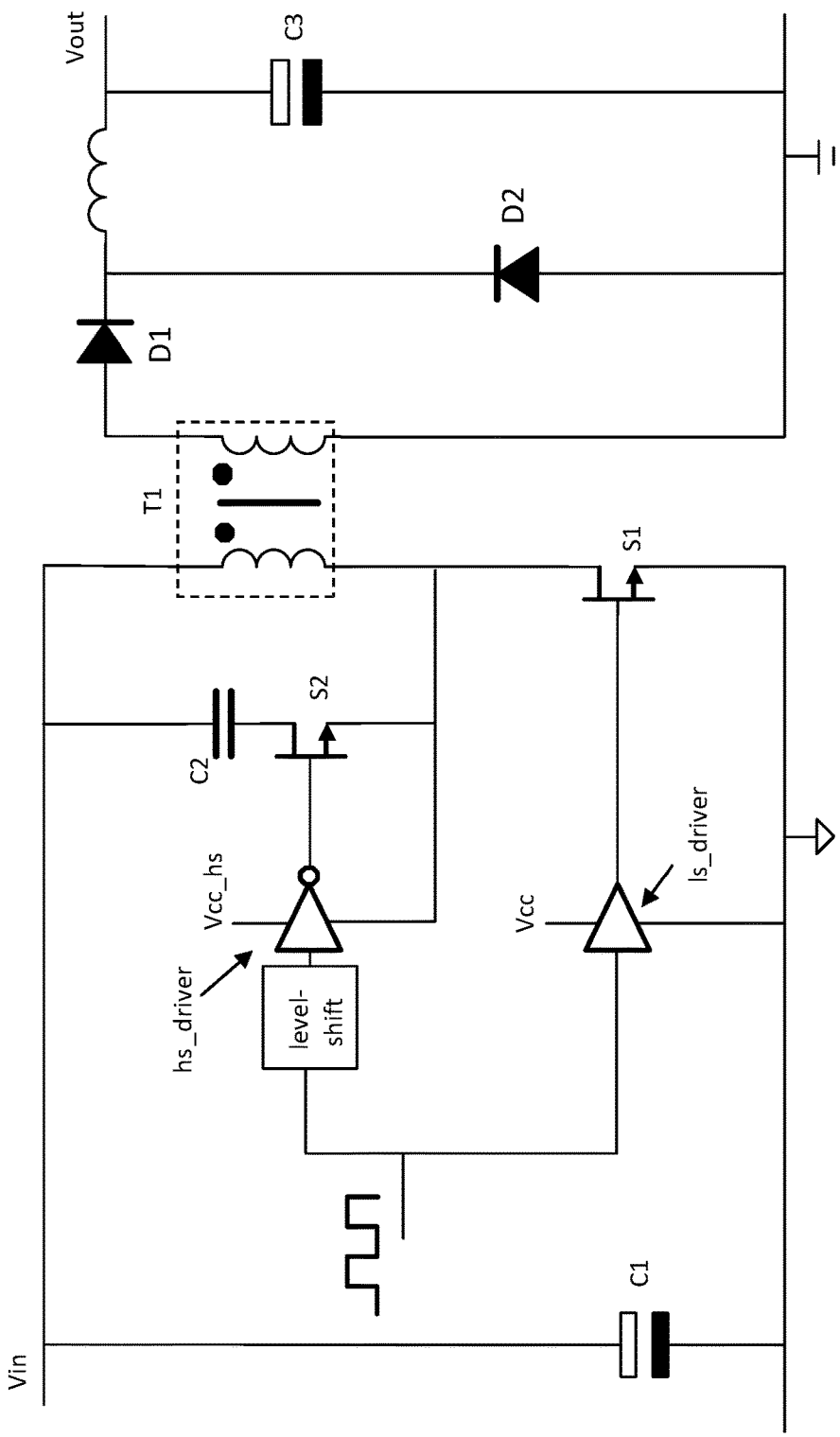
FIG. 3 shows a typical high side n-type switch "active clamp" forward type SMPS.

FIG. 3 shows a typical high side n-type switch "active clamp" forward type SMPS 300. The low side switch, S1, is driven by a low side driver, ls_driver. The clamp switch, S2, is driven via a level shifter by a high side driver.

As shown in FIG. 3, for a high side n-type switch "active clamp circuit", a level shift circuit is required. If this level shift circuit is integrated like in FIG. 1A, a high voltage IC (integrated circuit) process is required. For the AC mains applications, in some embodiments, the input voltage of the converter, Vin, can be up to about 400V. Accordingly, the drain voltage can reach voltages in access of 550V.

These high voltage IC processes are available, but typically these high voltage IC processes are not high-density IC processes. This results in large chip area and high costs.

Also, an additional high side supply voltage, Vcc_hs, is required. This adds costs and pins for the controller IC, IC1.

Therefore, it is desirable for an "active clamp" switched mode power supply (SMPS) to avoid the need for additional level shifters and additional high side supply voltage (e.g., Vcc_hs). As an example, such an "active clamp" SMPS (i.e., free of additional level shifters and additional high side supply voltages) is shown in FIG. 4A.

Figure 4A:
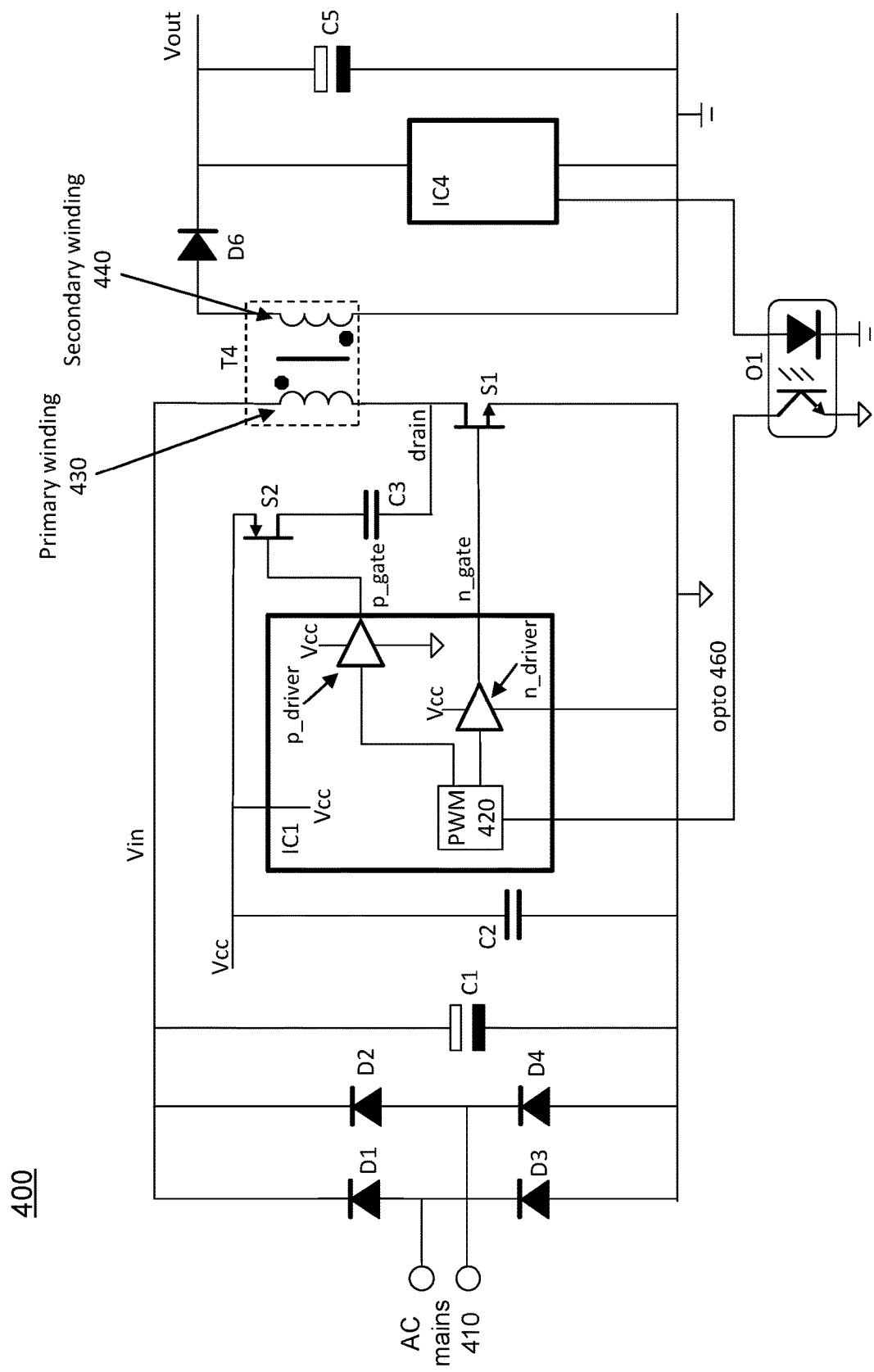
FIG. 4A shows a p-type switch "active clamp" switched mode power supply (SMPS), in accordance with some embodiments of the invention.

In general, FIG. 4A shows a p-type switch "active clamp" switched mode power supply (SMPS) 400, in accordance with some embodiments of the invention.

FIG. 4A shared some similar features with FIG. 1A, but FIG. 4A utilizes a p-type switch "active clamp" SMPS (instead of a n-type switch), and both drivers driving switches S1 and S2 are now supplied from the same supply voltage Vcc, so no high voltage level shifter is required. Also, no negative, additional supply voltage or additional components are needed to drive S2. Further, S2 can be directly coupled to the controller IC1.

Because SMPS 400 of FIG. 4A can be implemented without including additional level shifters and additional high side supply voltages, the p-type switch "active clamp"

topology illustrated by SMPS 400 of FIG. 4A can enable a low cost active clamp solution.

In particular, FIG. 4A shows that the AC mains 410, supplying the circuit, is connected via bridge rectifier diodes, D1, D2, D3 and D4 to an input storage capacitor C1. SMPS control IC (integrated circuit) is labelled as IC4 in FIG. 4A. IC4 drives MOSFET (metal-oxide-semiconductor field-effect transistor) switch S1 and S2 through pulse width modulator (PWM 420). S1 is a n-type MOSFET, while S2 is a p-type MOSFET. The pulse width modulator drives S1 and S2 alternatively. When S1 is made conductive, S2 is made non-conductive. When S2 is made conductive, S1 is made non-conductive. A small time interval can exist between switching one switch to non-conductive and the other to conductive. During this small time interval, both switches are non-conductive. This small non-overlap time interval is required to prevent shoot through.

S1 is driven by a first driver circuit, n_driver, via first gate signal n_gate. S2 is driven by a second driver circuit, p_driver, via second gate signal p_gate. Pulse width modulator (PWM 420) controls both driver circuits, n_driver and p_driver, directly. There is no need for a high voltage level shifter. The high voltage level shifter is not required because both driver circuits, n_driver and p_driver, are referenced to the supply voltage Vcc.

FIG. 4A shows that active clamp switch S2 is connected on one side to a positive voltage. In FIG. 4A, this positive voltage is the supply voltage Vcc. FIG. 4A also shows that the other side of the active clamp switch S2 is connected to a clamp capacitor C3.

FIG. 4A shows explicitly that clamp switch S2 is connected to the supply voltage Vcc. But in some embodiments (not shown in FIG. 4A), instead of using the supply voltage Vcc, another suitable positive voltage can also be used to connect to the clamp switch S2. Nevertheless, the supply voltage can be preferred because this does not require an additional voltage.

As stated in the previous paragraph, another suitable positive voltage can also be used to connect to the clamp switch S2. In some embodiments, this suitable positive voltage is not an input voltage to the transformer. In some embodiments, this suitable positive voltage can be any voltage higher than a switch-on voltage of the p-type S2 switch and lower than the maximum voltage rating of IC4. Finally, in some embodiments, this suitable positive voltage can be the supply voltage Vcc. And, as stated in the previous paragraph, connecting the clamp switch S2 to the supply voltage Vcc can be a preferred embodiment, because this does not require an additional voltage.

In FIG. 4A, IC4 is supplied by a supply voltage Vcc. Both driver circuits, n_driver and p_driver, can be supplied by supply voltage Vcc. It is not shown in FIG. 4A, but, in some embodiments, both driver circuits, n_driver and p_driver, can be supplied by a single positive voltage, or by two different positive voltages (for each driver). In some embodiments, the single positive voltage, or the two different positive voltages, are not an input voltage to the transformer. In some embodiments, the single positive voltage, or the two different positive voltages, can be any voltage higher than a switch-on voltage of the p-type S2 switch and lower than the maximum voltage rating of IC4.

Via transformer T4 and rectifier diode D6, the energy is transferred to the output capacitor C5 during the secondary stroke of the converter. FIG. 4A shows that transformer T4 is comprised of a primary winding 430 and a secondary winding 440, which are coupled via a mutual inductance.

The output voltage (Vout) is indirectly controlled by an integrated circuit IC4 via an opto-coupler (or optical isolator) O1. The opto-coupler O1 transfers electrical signal between the input side and the output side using light, wherein the output signal "opto 460" can be a measure of the light signal, which in turn is a measure of the output voltage (Vout) or the output power. The output signal "opto 460" is provided as an input to the pulse width modulator (PWM 420), so that the pulse width modulator (PWM 420) can adjust the pulse width modulation to provide the desired output voltage (Vout) or output power. The opto-coupler O1 (as shown in FIG. 4A) is comprised of LED (light-emitting diode) and a phototransistor in the same opaque package, but other types of opto-coupler can also be used. In some embodiments, the IC4 sends a power signal to an LED of opto-coupler O1. The LED of opto-coupler O1 emits light, which is picked up by a light-sensitive transistor of opto-coupler O1. The light-sensitive transistor of opto-coupler O1 then send a signal opto to IC1, which in turn controls PWM 420.

The input side and the output side of SMPS 400 are electrically isolated via T4 and O1.

Figure 4B:
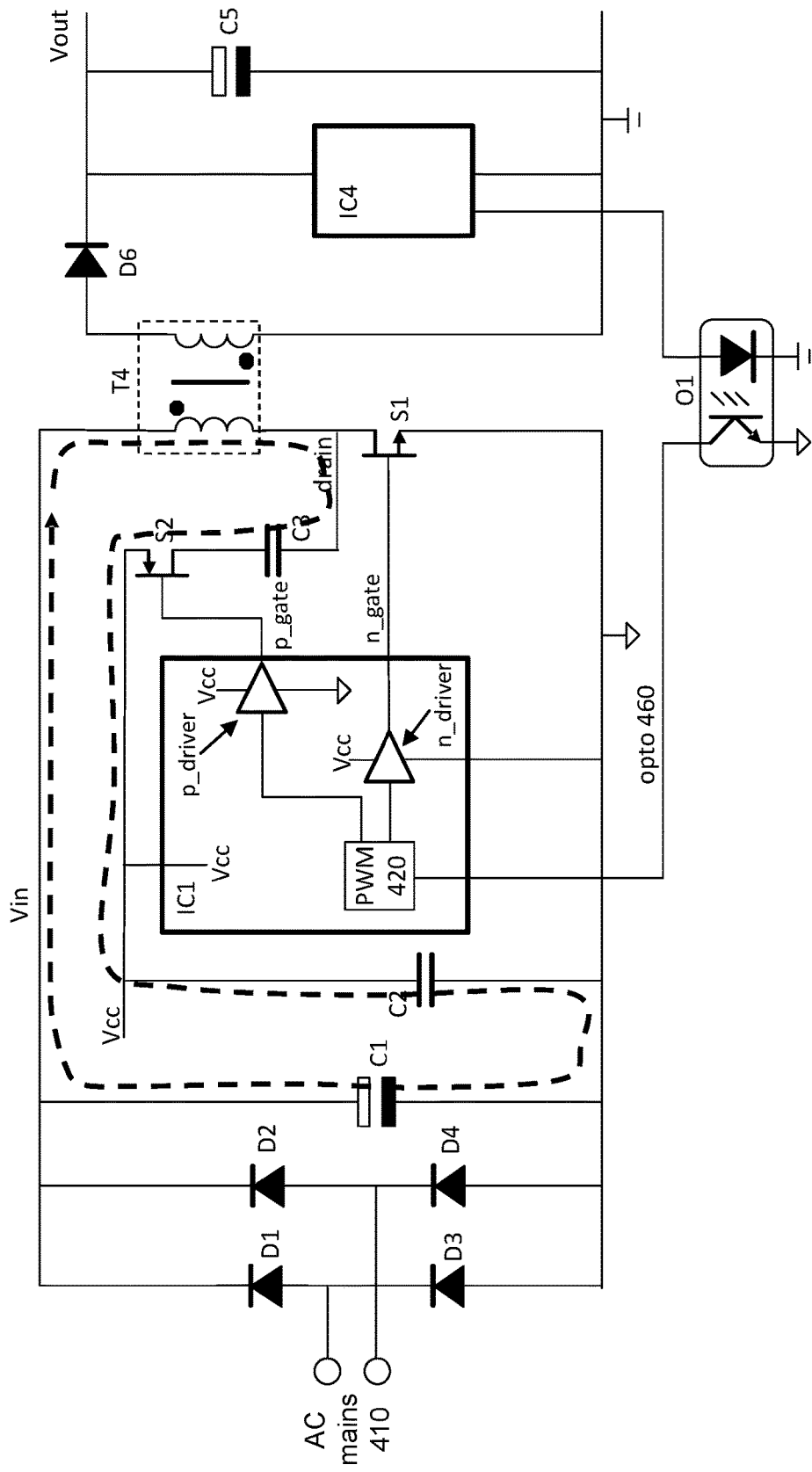
FIG. 4B shows a current path during an early part of the secondary stroke for an active clamp current in a p-type switch "active clamp" SMPS (from FIG. 4A), in accordance with some embodiments of the invention.

FIG. 4B shows a current path for an active clamp current in a p-type switch "active clamp" SMPS (from FIG. 4A), in accordance with some embodiments of the invention. In FIG. 4B, the current path is shown as a dashed line. Note that the current path for FIG. 4B (i.e., p-type switch "active clamp" SMPS) is different from the current path for FIG. 1B (i.e., n-type switch "active clamp" SMPS).

In some embodiments, supply capacitor C2 and storage capacitor C1 can have a much larger capacitance value than clamp capacitor C3. Thus, the series connection C1, C2, C3 can result in almost the same capacitance as C3. (As an example, C1 and C2 can be 100 times larger than C3.)

In some embodiments, the capacitance value of C3 is not critical in active clamp applications.

Figure 4C:
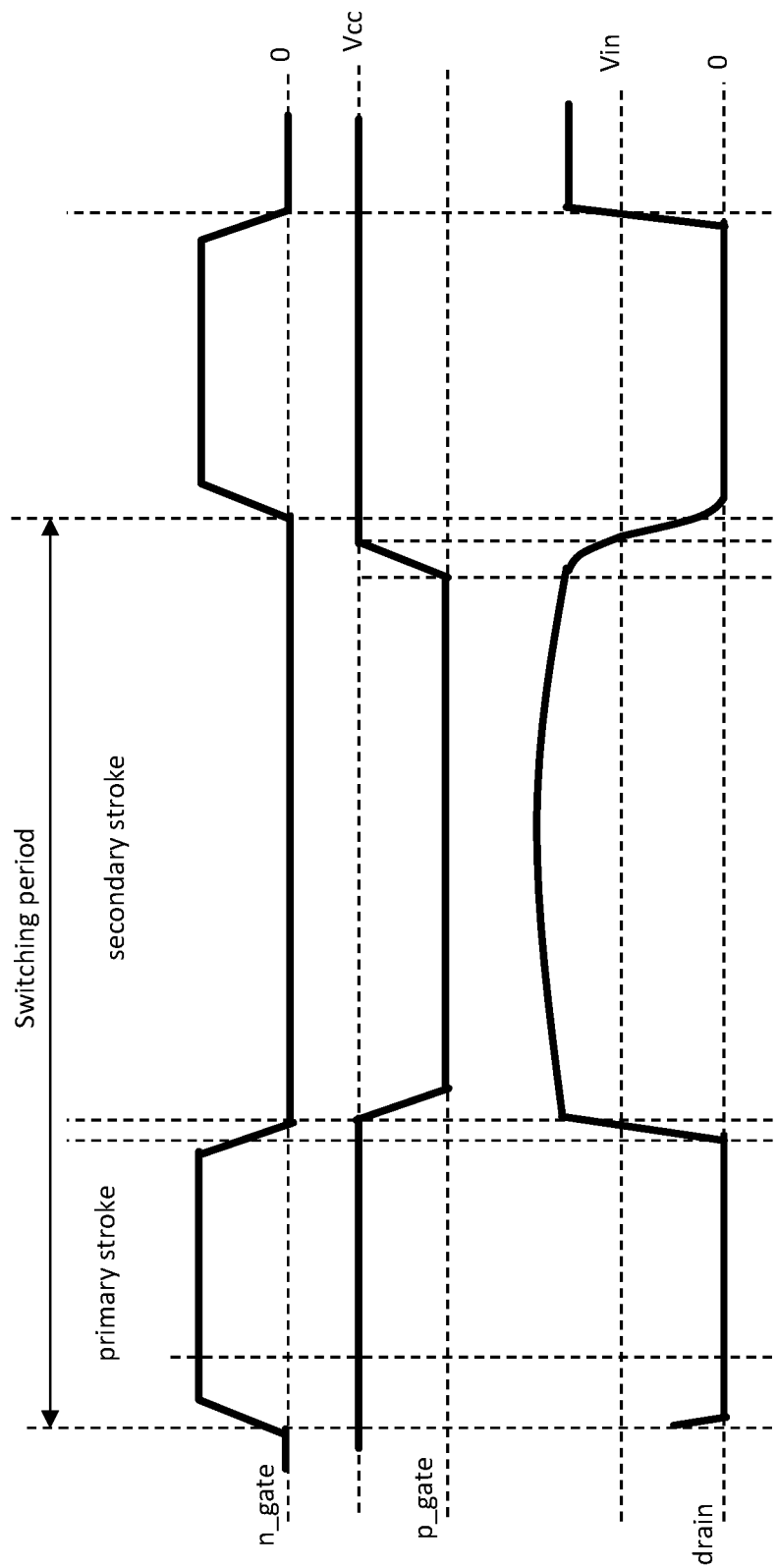
FIG. 4C shows relevant voltage signals (i.e., n_gate, p_gate, and drain) for a p-type switch "active clamp" SMPS (from FIG. 4A), in accordance with some embodiments of the invention.

FIG. 4C shows relevant voltage signals (i.e., n_gate, p_gate, and drain) for a p-type switch "active clamp" SMPS (from FIG. 4A), in accordance with some embodiments of the invention. Note that the p_gate signal references to the supply voltage Vcc, since the p_gate (i.e., p-type switch S2) is turned on when p_gate drops below Vcc.

The first gate signal n_gate is used to control power switch S1, while the second gate signal p_gate is used to control the active clamp switch S2. Notice that when n_gate is high (i.e., S1 is made conductive), p_gate is "high" (i.e., p_gate is at Vcc level, and S2 is made non-conductive). When n_gate is low (i.e., S1 is made non-conductive), p_gate is "low" (i.e., p_gate is made negative with respect to Vcc, and S2 is made conductive). FIG. 4C does not show the actual value for this "low" level of p_gate, except that this "low" level is lower than Vcc. But, in some embodiments, this "low" level of p_gate can be zero volt, or it can be limited to a certain voltage below Vcc dependent on the drive voltage requirements of S2.

Also notice that there is a small time interval existing between switching one switch to non-conductive and the other to conductive, when both switches are non-conductive. As explained previously, this small non-overlap time interval is required to prevent shoot through.

Also notice that when S1 is conductive (i.e., n_gate is high), the drain voltage is (close to) zero. Then, when S1 is made non-conductive (i.e., n_gate is low), S2 is made conductive (i.e., p_gate is "low", and p_gate drops below Vcc), and the drain voltage is able to rise to become Vin and higher.

Further notice that, if Vin is larger than Vcc, then the integrated clamp switch S2 drain voltage can become negative when S1 is made conductive (i.e., when n_gate is high). Note that this situation is not shown in FIG. 4C.

Similar to the n-type switch "active clamp" flyback topology of FIG. 1A, the p-type "active clamp" flyback topology of FIG. 4A can be used to recycle the energy in the leakage inductance of the transformer in switched mode power supplies (SMPS). For example, in transformer T4 of FIG. 4A, the primary winding 430 and a secondary winding 440 are coupled via the mutual inductance. This coupling will be non-perfect. The leakage inductance will store some energy during the switching of the converter that will not be transferred to the secondary side. To recycle the energy in the leakage inductance an active clamp circuit is added. The circuit consists of clamp capacitor C3, clamp switch S2, and driver circuit p_driver. The active clamp circuit transfers the energy from the leakage inductance to the clamp capacitor C3 at the start of the secondary stroke, and releases this energy to the output through transformer T4 during the rest of the secondary stroke. In this way, the p-type "active clamp" flyback topology of FIG. 4A is able to recycle energy from the leakage inductance of the transformer.

FIG. 4A shows that a p-type "active clamp" flyback topology can be used in switched mode power supplies (SMPS) to recycle the leakage inductance energy losses. In other embodiments, the active clamp solution (to recycle the leakage inductance energy losses) can be an active clamp flyback, an active clamp forward, or any other active clamp switched mode power supply (SNIPS) topology.

Figure 5:
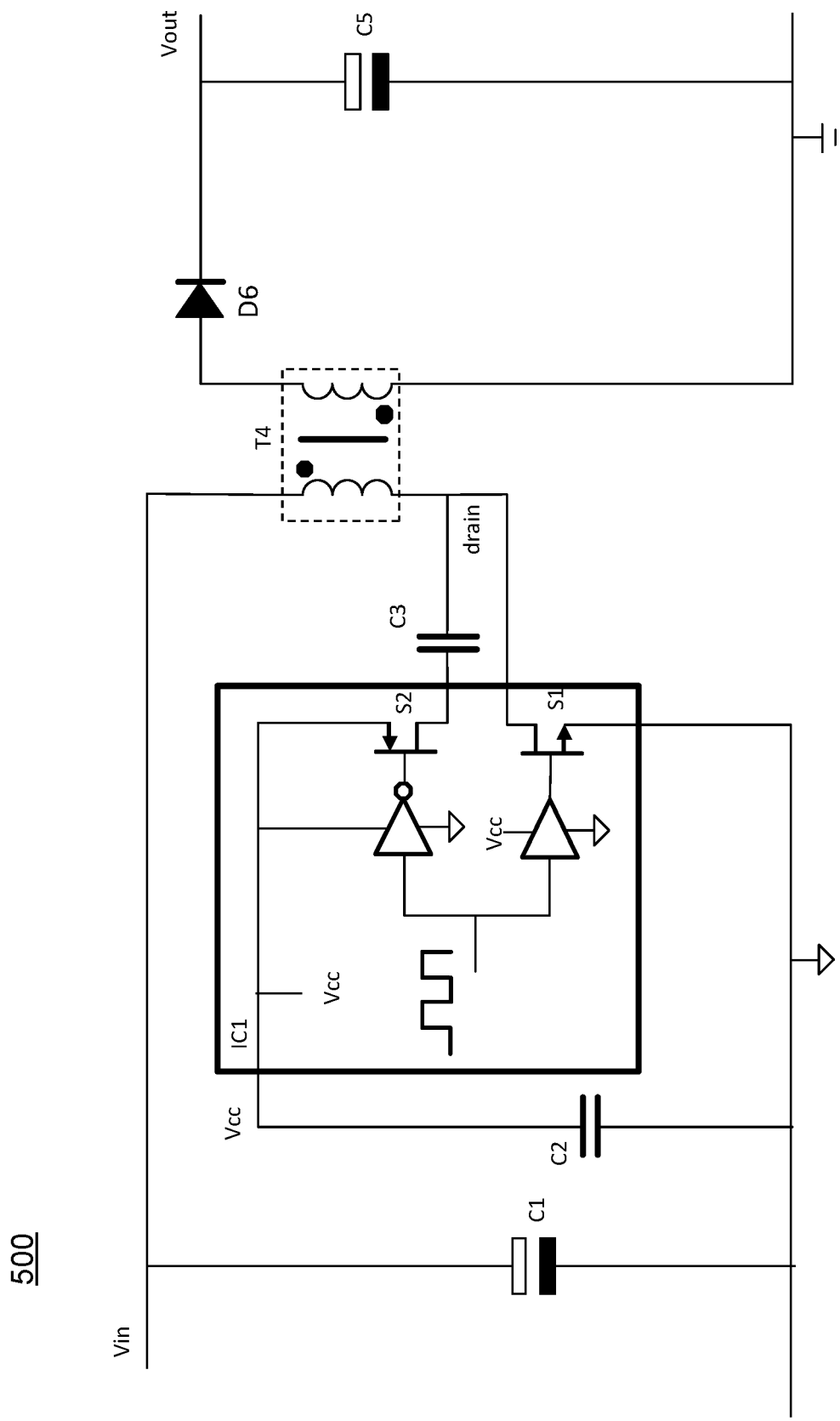
FIG. 5 shows a p-type switch "active clamp" SMPS (where a power switch S1, an active clamp switch S2, and their corresponding drivers can be integrated in an integrated circuit), in accordance with some embodiments of the invention.

FIG. 5 shows a p-type switch "active clamp" SNIPS (where a power switch S1, an active clamp switch S2, and their corresponding drivers can be integrated in an integrated circuit), in accordance with some embodiments of the invention. Other than showing that "a power switch S1, an active clamp switch S2, and their corresponding drivers can be integrated in an integrated circuit", FIG. 5 is similar to FIG. 4A in every other way.

As shown in FIG. 5, in some embodiments, an integrated circuit can include all of the following: (i) the power switch, (ii) the active clamp switch, (iii) the first driver, (iv) the second driver. This is not shown in FIG. 5, but in some embodiments, an integrated circuit can include one or more of the following: (i) the power switch, (ii) the active clamp switch, (iii) the first driver, (iv) the second driver. Note that FIG. 5 shows that a high integration level can be achieved with the embodiments illustrated and suggested by the SMPS shown in FIG. 5.

Figure 6:
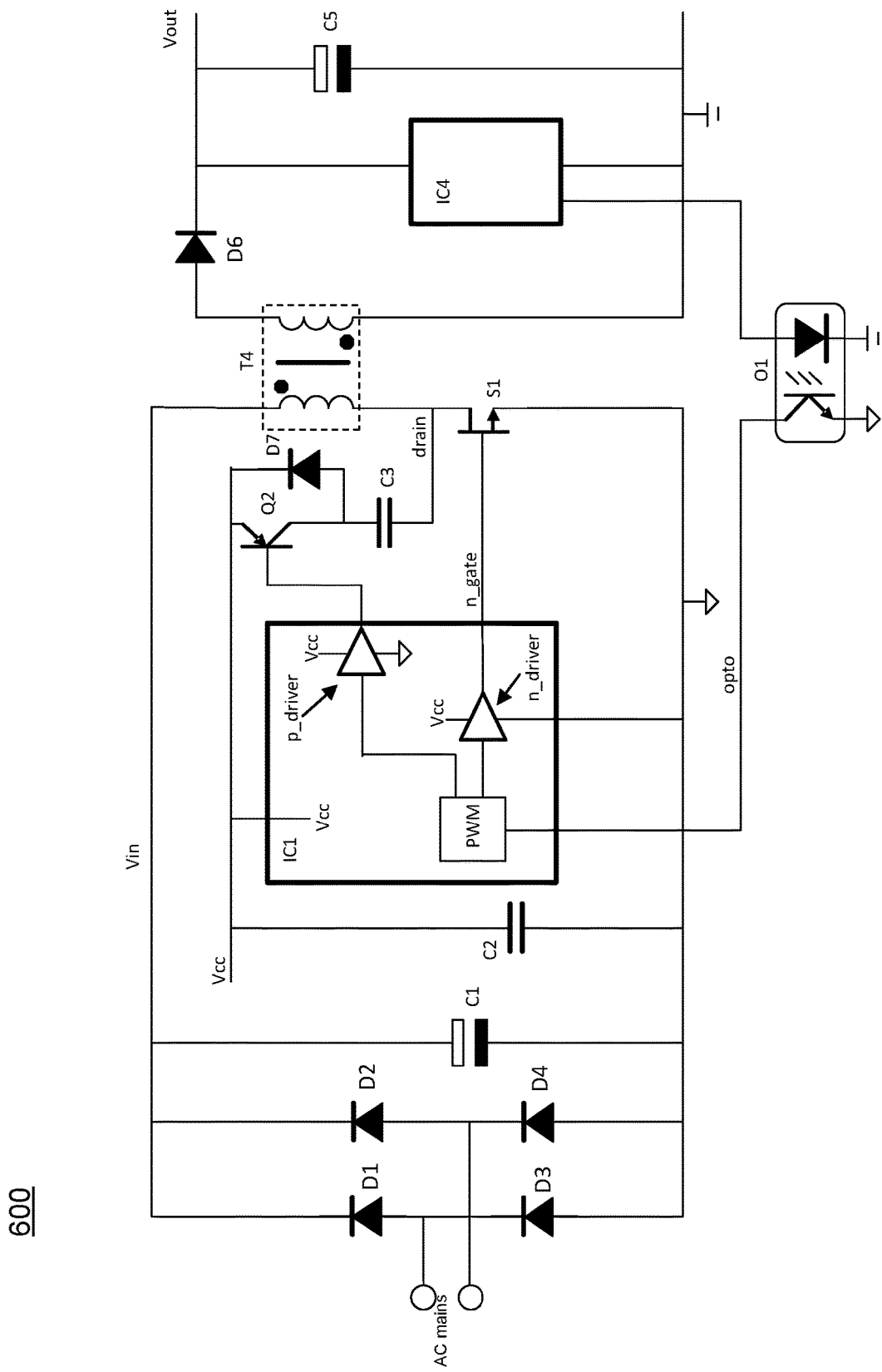
FIG. 6 shows a p-type switch "active clamp" SMPS (where a PNP bipolar junction transistor is implemented as an active clamp switch Q2), in accordance with some embodiments of the invention.

FIG. 6 shows a p-type switch "active clamp" SNIPS (where a PNP bipolar junction transistor is implemented as an active clamp switch Q2), in accordance with some embodiments of the invention. Because a BJT (bipolar junction transistor) do not have a body diode like a MOSFET, diode D7 is added. Other than substituting S2, which is p-type MOSFET, with Q2, which is a PNP bipolar junction transistor, FIG. 6 is similar to FIG. 4A in every other way.

FIGS. 6 and 4A shows that the active clamp switch (Q2 or S2) is a p-type device. This p-type device can be a p-type MOSFET, a p-type bipolar junction transistor (BJT), or another p-type semiconductor switching device.

Figure 7:
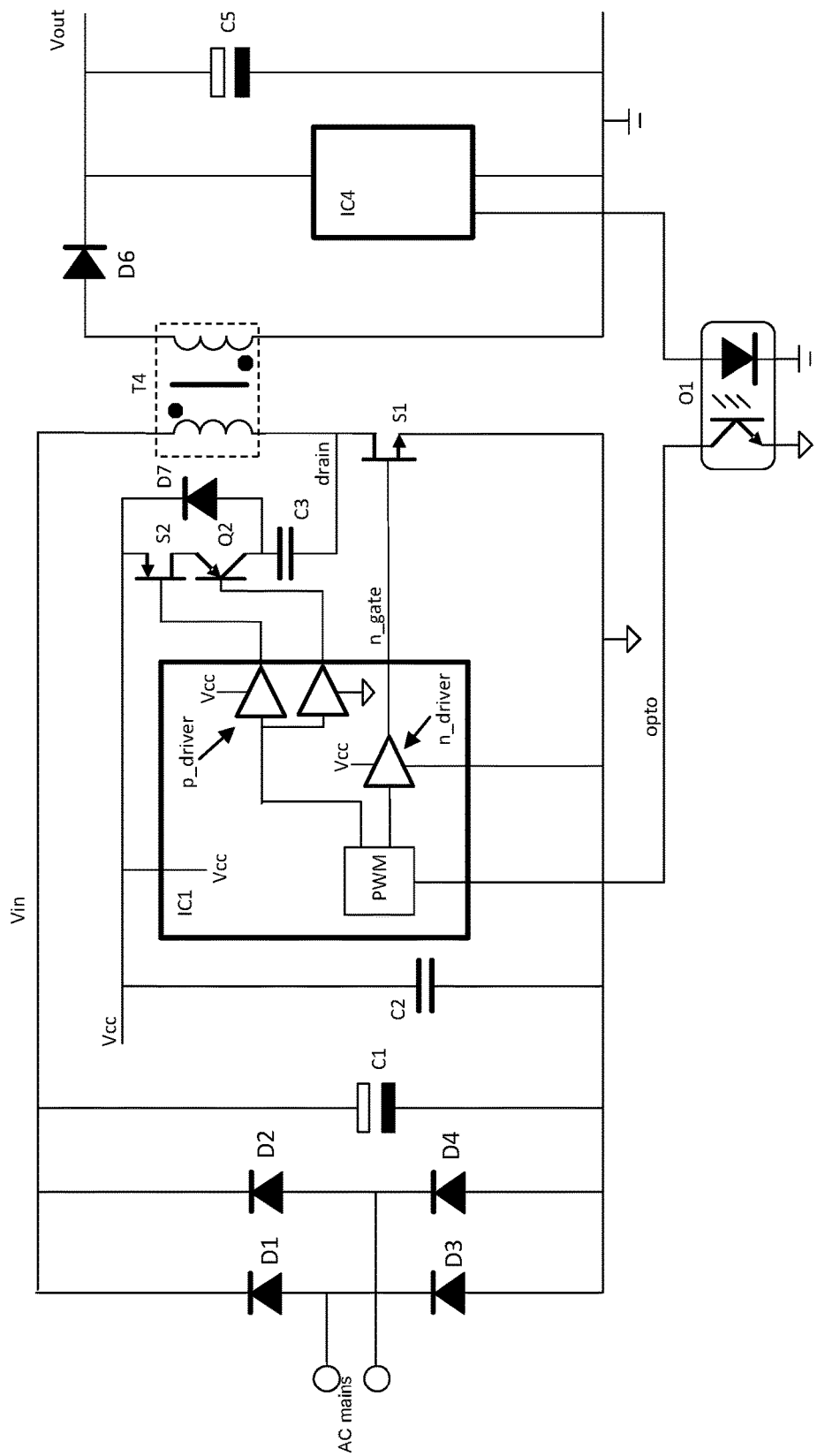
FIG. 7 shows a p-type switch "active clamp" SMPS (where an emitter switch, which is comprised of a p-type MOSFET and a PNP bipolar junction transistor in series, is implemented as an active clamp switch), in accordance with some embodiments of the invention.

FIG. 7 shows a p-type switch "active clamp" SNIPS (where an emitter switch, which is comprised of a p-type MOSFET and a PNP bipolar junction transistor in series, is implemented as an active clamp switch), in accordance with some embodiments of the invention. Emitter switching may be preferred over a BJT only, because BJTs may have a lower switching speed than MOSFETs. By driving the BJT on the emitter, a high switching speed can be achieved. Other than adding a Q2 (which is a PNP bipolar junction transistor) to be in series with S2 (which is p-type MOSFET), FIG. 7 is similar to FIG. 4A in every other way.

FIG. 7 further shows that the active clamp switch can also be a series combination of switches where at least one of the switches is a p-type switch connected to a positive voltage (e.g., emitter switching).

Figure 8:
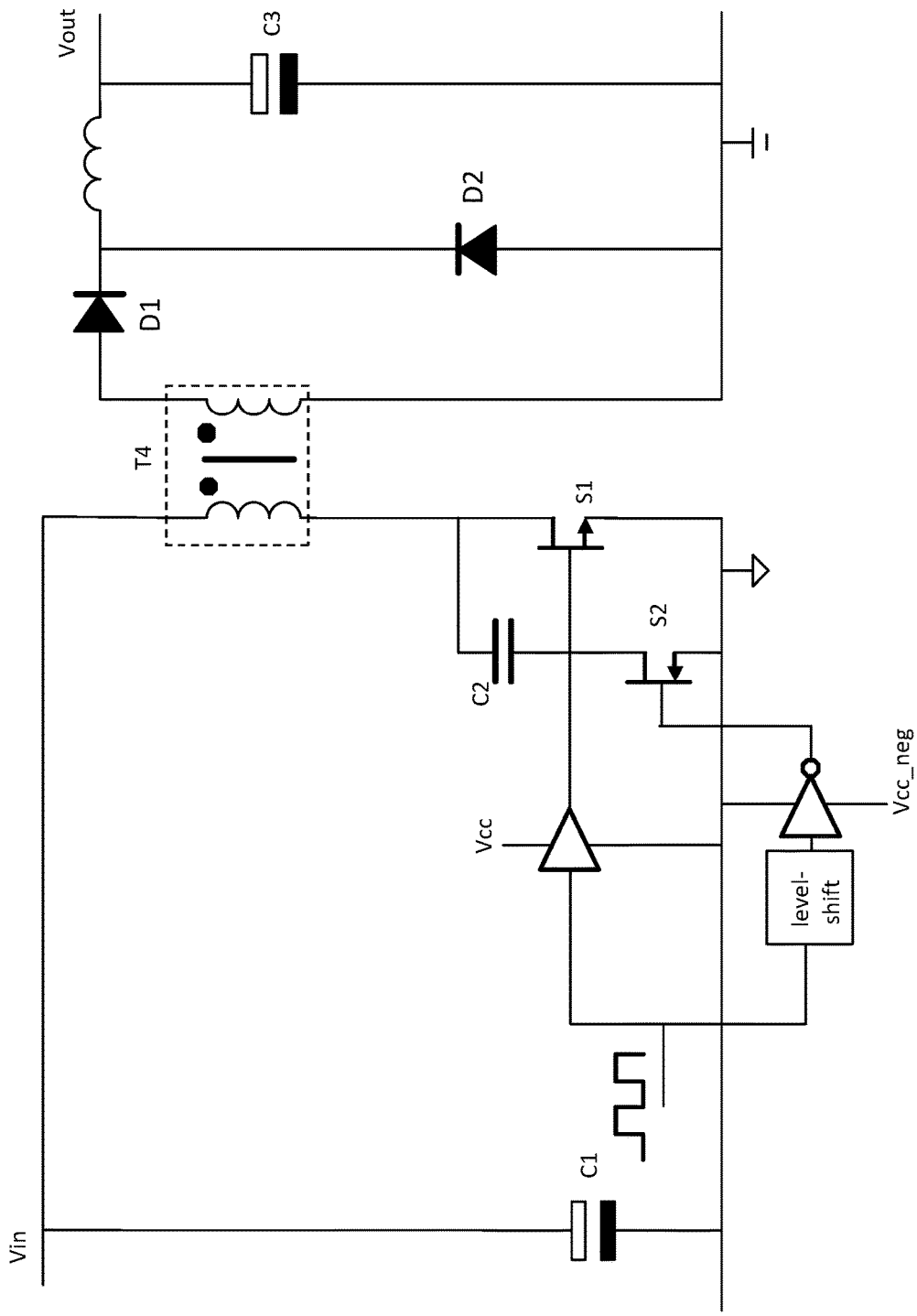
FIG. 8 shows a p-type switch "active clamp" forward type SMPS that utilizes a negative supply voltage (i.e., Vcc_neg), in accordance with some embodiments of the invention.

FIG. 8 shows a p-type switch "active clamp" forward type SMPS that utilizes a negative supply voltage (i.e., Vcc_neg), in accordance with some embodiments of the invention.

From another point view, the SMPS shown in FIG. 8 can also be described as a low side p-type switch "active clamp" forward type converter. In FIG. 8, the clamp switch, S2, is a p-type switch. The driver for S2 outputs a negative voltage to make S2 (which is a p-type switch) conductive. As shown in FIG. 8, an additional negative supply voltage (i.e., Vcc_neg), and a level shifter (level-shift) are required for this driver.

For creating a negative supply voltage, additional circuitry is needed. For integration, negative voltages are unwanted, because additional diffusion layers will be required in bulk processes. This will add costs. For Silicon on Insulator (SOI) processes, these diffusion layers may not be needed, but SOI wafers are typically more expensive than bulk process wafers. Therefore, this will also add costs.

Because the SMPS shown in FIG. 8 requires both an additional negative supply voltage (i.e., Vcc_neg) and a level shifter (level-shift), this will result in a larger chip area with higher complexity and higher costs. Therefore, the SMPS shown in FIG. 8 can be considered to be a less optimal embodiment than the SMPS shown in FIG. 4A.

Figure 9:
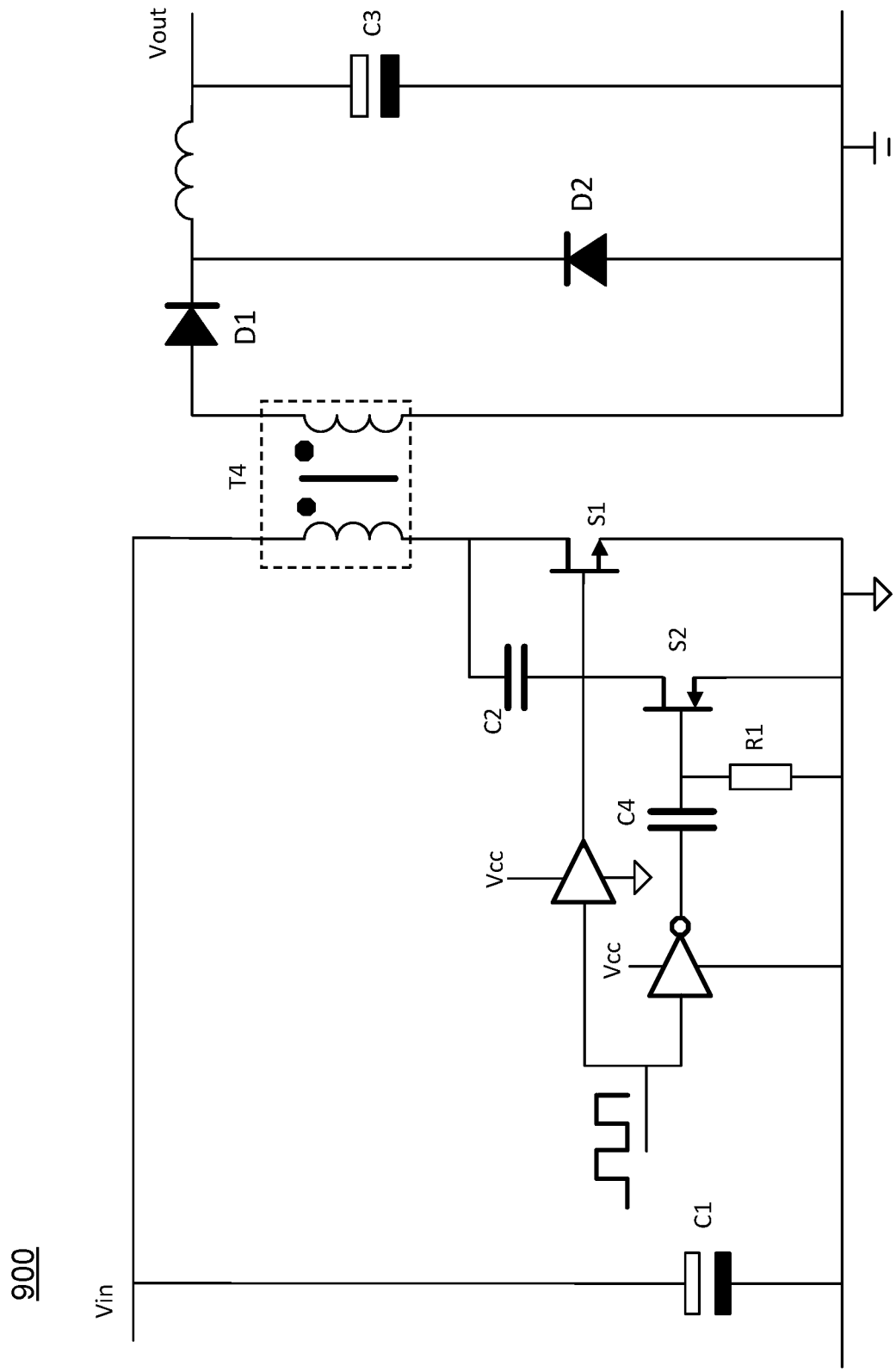
FIG. 9 shows a p-type switch "active clamp" forward type SMPS that utilizes a positive supply voltage (i.e., Vcc), in accordance with some embodiments of the invention.

FIG. 9 shows a p-type switch "active clamp" forward type SMPS that utilizes a positive supply voltage (i.e., Vcc), in accordance with some embodiments of the invention.

From another point view, the SMPS shown in FIG. 9 can also be described as a low side p-type switch "active clamp" forward type converter. In FIG. 9, the clamp switch, S2, is a p-type switch. To overcome the need for a negative supply voltage, the p-type switch S2 is capacitively coupled to the driver. Although no negative supply voltage is now required, additional components, capacitor C4 and resistor R1, need to be added.

Because the SMPS shown in FIG. 9 requires additional components, this will result in a solution with higher complexity and higher costs. Therefore, the SMPS shown in FIG. 9 can also be considered to be a less optimal embodiment than the SMPS shown in FIG. 4A.

Figure 10:
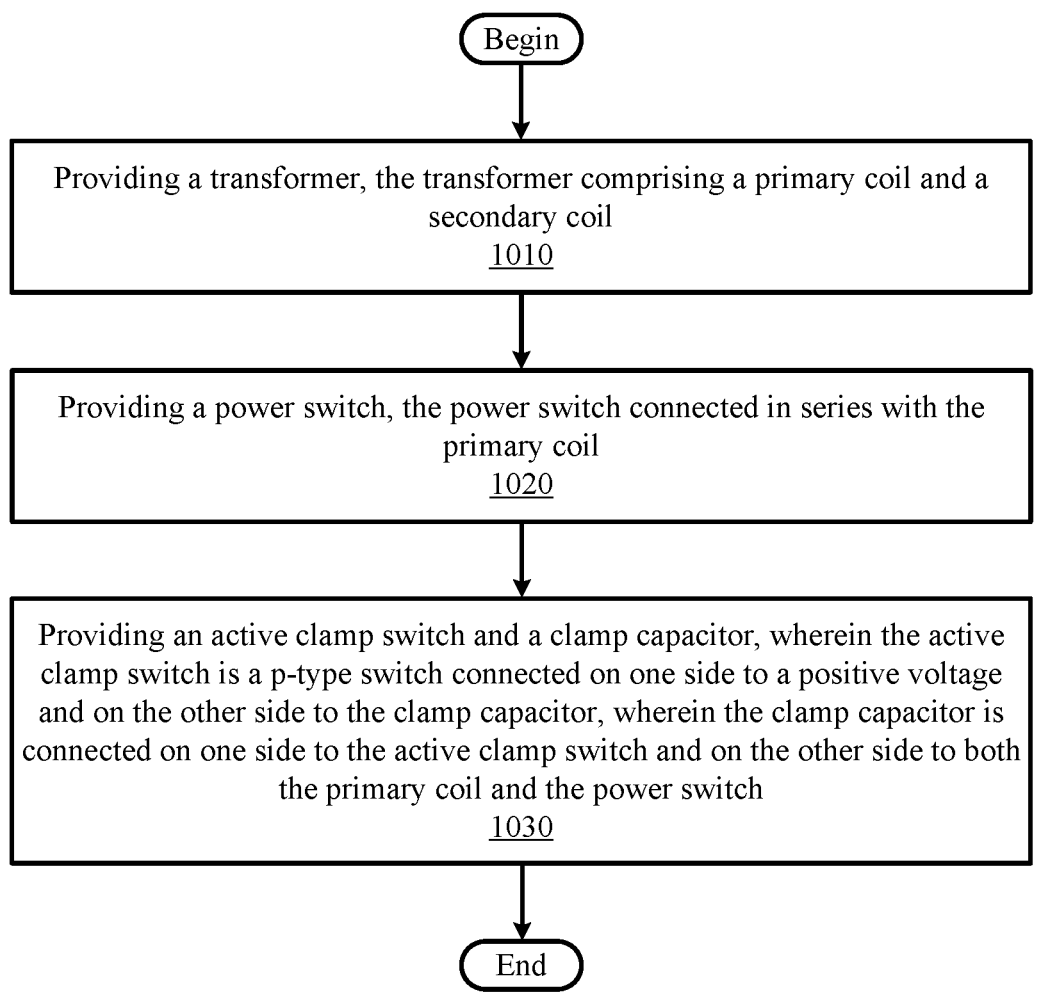
FIG. 10 shows a process flow diagram of a method for operating a p-type switch active clamp switched mode power supply (SMPS), in accordance with some embodiments of the invention.

FIG. 10 shows a process flow diagram of a method for operating a p-type switch active clamp switched mode power supply (SMPS), in accordance with some embodiments of the invention. As shown in FIG. 10, the method 1000 begins at step 1010, where the method provides a transformer, the transformer comprising a primary coil and a secondary coil. Next, at step 1020, the method provides a power switch, the power switch connected in series with the primary coil. Finally, at step 1030, the method provides an active clamp switch and a clamp capacitor, wherein the active clamp switch is a p-type switch connected on one side to a positive voltage and on the other side to the clamp capacitor, wherein the clamp capacitor is connected on one side to the active clamp switch and on the other side to both the primary coil and the power switch.

In this specification, example embodiments have been presented in terms of a selected set of details. However, a person of ordinary skill in the art would understand that many other example embodiments may be practiced which include a different selected set of these details. It is intended that the following claims cover all possible example embodiments.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disc, and an optical disc. Examples of optical discs include a compact disc with read only memory (CD-ROM), a compact disc with read/write (CD-R/W), a digital video disc (DVD), and a Blu-ray disc.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An active clamp switched mode power supply comprising:
    a transformer, the transformer comprising a primary coil and a secondary coil;
    a power switch, the power switch connected in series with the primary coil;
    a clamp capacitor;
    an active clamp switch, wherein the active clamp switch is a p-type switch connected on one side to a positive voltage and on a second side to the clamp capacitor, wherein the positive voltage is a voltage higher than a switch-on voltage of the p-type switch and lower than a maximum voltage rating of an integrated circuit (IC), wherein the clamp capacitor is connected in series with the active clamp switch;
    wherein the clamp capacitor is connected on one side to the active clamp switch and on the second side to both the primary coil and the power switch.

2. The switched mode power supply of claim 1, wherein the active clamp switch recycles energy from a leakage inductance in the transformer.

3. The switched mode power supply of claim 1 further comprising:
    a first driver configured to drive the power switch;
    a second driver configured to drive the active clamp switch,
    wherein the second driver is supplied by the positive voltage.

4. The switched mode power supply of claim 3, wherein an integrated circuit includes one of more of the following:
    the power switch,
    the active clamp switch,
    the first driver,
    the second driver.

5. The switched mode power supply of claim 1, wherein the positive voltage is not an input voltage to the transformer.

6. The switched mode power supply of claim 1, wherein the positive voltage is a supply voltage.

7. The switched mode power supply of claim 1, wherein the transformer is a coupled inductor.

8. The switched mode power supply of claim 1, wherein the p-type switch is comprising of one of the following:
    a p-type MOSFET (metal-oxide semiconductor field-effect transistor),
    a PNP BJT (bipolar junction transistor),
    any p-type semiconductor switching device.

9. The switched mode power supply of claim 1,
    wherein the p-type switch is one of a plurality of switches connected in series.

10. The switched mode power supply of claim 9, wherein the p-type switching device is comprising of one of the following:
    a p-type MOSFET (metal-oxide semiconductor field-effect transistor),
    a PNP BJT (bipolar junction transistor),
    any p-type semiconductor switching device.

11. The switched mode power supply of claim 1, wherein a topology of the switched mode power supply is one of the following:
    an active clamp flyback,
    an active clamp forward,
    any other active clamp switched mode power supply topology.

12. A method for operating an active clamp switched mode power supply, the method comprising:
    providing a transformer, the transformer comprising a primary coil and a secondary coil;
    providing a power switch, the power switch connected in series with the primary coil;
    providing an active clamp switch and a clamp capacitor, wherein the active clamp switch is a p-type switch connected on one side to a positive voltage and on a second side to the clamp capacitor, wherein the positive voltage is a voltage higher than a switch-on voltage of the p-type switch and lower than a maximum voltage rating of an integrated circuit (IC),
    wherein the clamp capacitor is connected in series with the active clamp switch; wherein the clamp capacitor is connected on one side to the active clamp switch and on the second side to both the primary coil and the power switch.

13. The method of claim 12, wherein the active clamp switch and the clamp capacitor recycles energy from a leakage inductance in the transformer.

14. The method of claim 12, wherein the transformer transforms from a first voltage to a second voltage.

15. The method of claim 12, wherein the power switch controls a power that is transformed by the transformer.

16. The method of claim 12 further comprising:
providing a first driver to drive the power switch;
providing a second driver to drive the active clamp switch,
wherein the second driver is supplied by the positive voltage.

17. The method of claim 12, wherein the positive voltage is not an input voltage to the transformer.

* * * * *